US008783321B2

(12) United States Patent
Sevaille et al.

(10) Patent No.: US 8,783,321 B2
(45) Date of Patent: Jul. 22, 2014

(54) PLANT FOR MANUFACTURING A RUBBER-COATED ELECTRONIC COMPONENT

(75) Inventors: Alain Sevaille, Aulnat (FR); Pierre Wiel, Yssac-la-Tourette (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 622 days.

(21) Appl. No.: 13/000,820

(22) PCT Filed: Jun. 19, 2009

(86) PCT No.: PCT/FR2009/051178

§ 371 (c)(1), (2), (4) Date: Apr. 4, 2011

(87) PCT Pub. No.: WO2010/007283

PCT Pub. Date: Jan. 21, 2010

(65) Prior Publication Data

US 2011/0284155 A1 Nov. 24, 2011

(30) Foreign Application Priority Data

Jun. 23, 2008 (FR) ..................................... 08 54148

(51) Int. Cl.
*B29C 65/00* (2006.01)

(52) U.S. Cl.
USPC ............................ 156/552; 156/560; 156/567

(58) Field of Classification Search
USPC ............ 156/244.12, 276, 290, 292, 297, 298, 156/299, 300, 301, 313, 324, 560, 562, 555, 156/547, 552, 567, 568
See application file for complete search history.

(56) References Cited

U.S. PATENT DOCUMENTS

| | | | | |
|---|---|---|---|---|
| 2,372,617 | A * | 3/1945 | Trew | 156/252 |
| 2,987,104 | A * | 6/1961 | Benedict | 156/80 |
| 7,172,130 | B2 * | 2/2007 | Tsunoda et al. | 235/492 |
| 7,374,107 | B2 | 5/2008 | Betrand | |
| 7,728,733 | B2 | 6/2010 | Baba et al. | |
| 2002/0175047 | A1 * | 11/2002 | Blumenthal et al. | 198/459.8 |
| 2002/0195195 | A1 * | 12/2002 | Grabau et al. | 156/300 |
| 2005/0076982 | A1 | 4/2005 | Metcalf et al. | |
| 2008/0042851 | A1 | 2/2008 | Baba et al. | |

FOREIGN PATENT DOCUMENTS

| | | | |
|---|---|---|---|
| CN | 1717760 | | 1/2006 |
| CN | 101122959 | | 2/2008 |
| EP | 1 887 493 | | 2/2008 |
| JP | 52126455 | A * | 10/1977 |
| JP | 10-236041 | | 9/1996 |
| JP | 2002-544631 | | 12/2002 |
| JP | 2005-096423 | | 4/2005 |
| JP | 2005-116771 | | 4/2005 |
| JP | 2008-046668 | | 2/2008 |
| JP | 2008-083792 | | 4/2008 |
| WO | WO 87/00820 | | 2/1987 |

* cited by examiner

*Primary Examiner* — John Goff
(74) *Attorney, Agent, or Firm* — Cozen O'Connor

(57) ABSTRACT

A method for manufacturing at least one member comprising at least one rubber-coated electronic component, in which the component is placed in contact with a first strip of rubber and it is covered by a second strip of rubber so as to coat the component.

10 Claims, 3 Drawing Sheets

30 34 52 Z X 46 -48- 44 36 46 63 61 60 58 -50- 58 38 42 46 46 56 32 62 70 68 20 54 22 18

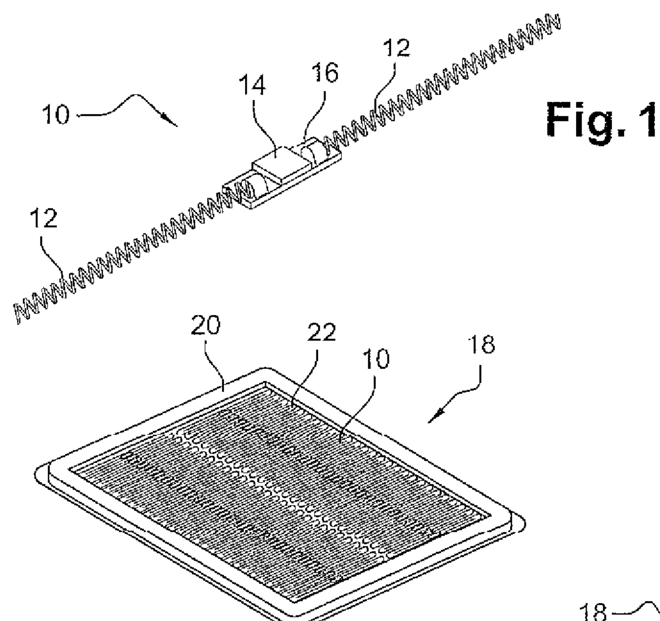
10
14
16
12
12
Fig. 1
20
22
10
18
Fig. 2
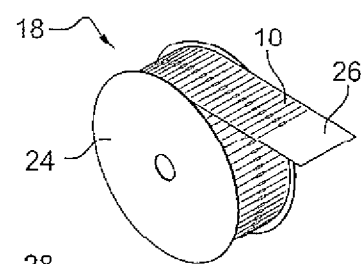
18
10
26
24
Fig. 3
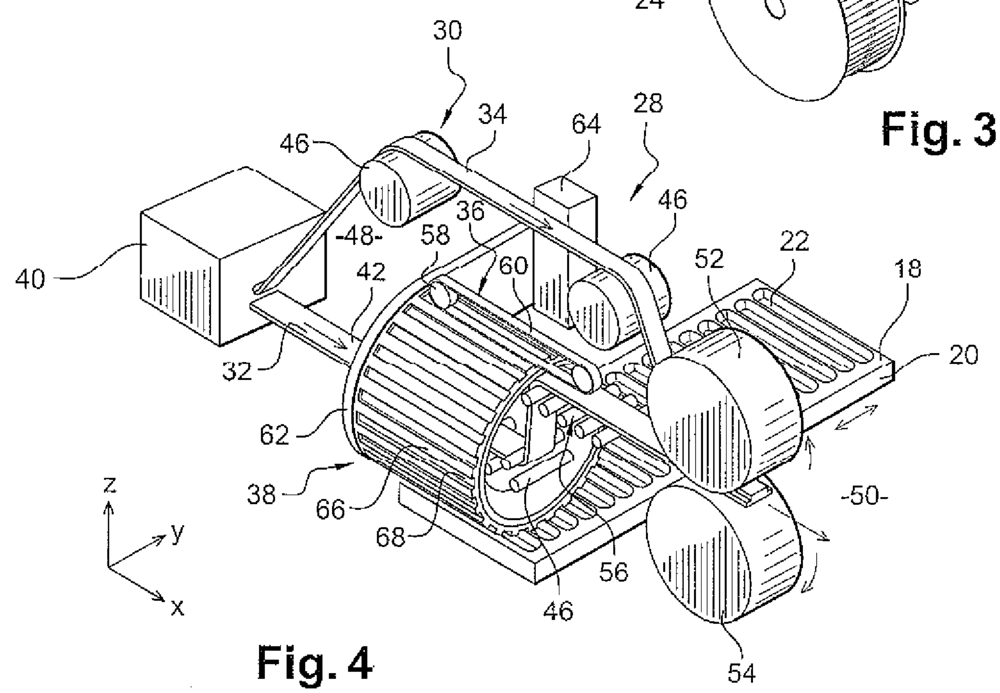
30
34
64
28
46
46
-48-
36
58
60
52
22
18
40
42
32
20
62
38
66
68
46
56
-50-
54
z
y
x
Fig. 4

PLANT FOR MANUFACTURING A RUBBER-COATED ELECTRONIC COMPONENT

RELATED APPLICATION

This is a U.S. National Phase Application under 35 USC 371 of International Application PCT/FR2009/051178, filed on Jun. 19, 2009.

This application claims the priority of French patent application no. 08/54148 filed Jun. 23, 2008, the entire content of which is hereby incorporated by reference.

FIELD OF THE INVENTION

The invention relates to the manufacture of a member comprising at least one rubber-coated electronic component and designed to be sunk into a tire or secured to its surface.

BACKGROUND OF THE INVENTION

It is normal practice to incorporate into a tire an electronic component comprising for example a passive radio-frequency identification transponder furnished with two antennas forming a bipole. This type of transponder is usually identified by the acronym RFID. Such an electronic component can store data, for example relating to the manufacture of the tire.

To improve the quality of transmission of the data stored in the electronic component, it is normal to previously coat it in rubber. Specifically, in a general manner, the higher the dielectric constant of the mass of rubber coating the electric member, the more the electric signal received and sent by the electronic member is attenuated. Since the dielectric constants of the rubbers usually used for the manufacture of tires are high, the transmission of the data is greatly improved if the dielectric constant of the rubber for coating the electronic component is low. Preferably, the dielectric constant of the mass of coating rubber is less than 3 in the UHF frequency range (higher than 300 MHz).

Moreover, the prior coating of the component makes it possible to protect it when it is stored before being installed on a tire.

SUMMARY OF THE INVENTION

In the prior art, various methods for manufacturing a member comprising a rubber-coated electronic component are known. One object of the invention is to provide a new manufacturing method that is simple and cheap to apply.

Accordingly, one aspect of the invention is directed to a method for manufacturing at least one member comprising at least one rubber-coated electronic component, the component is placed in contact with a first strip of rubber and it is covered by a second strip of rubber so as to coat the component, and in that the two strips run substantially at the same speed from a first zone the two strips are separated to a second zone two respective faces of the two strips are in contact with each other.

By virtue of the method of the invention, the manufacture of a member comprising at least one rubber-coated electronic component is simple, fast and cheap. Specifically, strips of rubber can be manufactured simply, for example by means of an extruder. Then, it is sufficient to insert one or more electronic components between two strips of rubber in order to coat them totally. Because of the general elongated shape of the strips of rubber, it is possible to have them both run at one and the same substantially constant speed and to bring them together in a second zone in order to coat the components that will have been previously placed in the first zone.

Preferably, the first strip of rubber is placed substantially horizontally and the electronic component is placed on the top face of this first strip. Then, the second strip is placed on top of the top face of the first strip so as to cover the component. Naturally, it is also possible to place the electronic component on the bottom surface of the first strip of rubber, the attachment of the component to the strip being obtained by virtue of the adhesive properties of the rubber. Thereafter, the assembly of the first strip and of the component is placed on a second strip of rubber so as to coat the component.

The method according to an embodiment of the invention may also comprise one or more of the following features.

- The two strips are cut crosswise simultaneously after the component has been coated. This manner of proceeding makes manufacturing easier and increases its productivity. Specifically, it makes it possible to place a plurality of electronic components along the first strip of rubber, spacing them evenly, and then to coat all of the components in a single operation with the aid of a second strip of rubber. Then, it is sufficient to cut the two strips of rubber crosswise between two adjacent electronic components in order to divide these strips of rubber into a plurality of members.
- At regular intervals, at least one component is placed on the said face of one of the strips, in a predetermined placement zone situated in the first zone. Since the strips run, it is possible to place components at regular intervals in a predetermined and fixed zone. Because the placement zone is fixed, it simplifies the placement step which can therefore be automated.
- The component is placed at a speed that is substantially identical and parallel to that of the run of the strip. This allows the relative speed of the component compared with the first strip to be substantially zero when the component is placed. This therefore reduces the risk that this placement step damages the electronic component or the rubber strip because of an impact due to a speed differential.

Another aspect of the invention is directed to a plant for manufacturing at least one member comprising at least one rubber-coated electronic component, comprising:

- means for running two strips of rubber arranged to cause the strips to run from a first zone in which they are separated to a second zone in which two respective faces of the two strips are in contact with one another,
- means for placing the component on the said face of one of the rubber strips, in a predetermined placement zone situated in the first zone.

This plant is suitable for applying the method defined above.

The plant according to an embodiment of the invention may also comprise one or more of the following features.

- The plant comprises means for feeding the placement means with components.
- The placement means comprise a conveyor arranged to convey a component from the feeding means to the placement zone. Preferably, this conveying is, carried out at a speed that is substantially identical to the run speed of the rubber strip. This conveyor may, for example, be a notched belt extending from the feeding means to the placement zone. Preferably, the direction of conveying is substantially parallel to the direction of run of the rubber strip at the predetermined placement zone.

The feeding means comprise a drum arranged between the placement means and means for storing components. The storage means allow the storage of components for the purpose of manufacturing the members. The drum makes it possible to extract the components from the storage means and to present them to the placement means in order to be placed on the rubber strip.

The feeding means comprise means for moving the drum in translation between the placement means and the storage means, and means for rotating the drum.

The drum comprises magnetic means for holding the components on its outer surface. Therefore, the mechanical means make it possible to hold a component initially stored in the storage means on the outer surface of the drum. Then, a rotation of the drum by virtue of the rotation means makes it possible to move the component from the storage means to the placement means. The deactivation of the magnetic means then makes it possible to release the electronic component from the drum to the placement means.

The drum comprises a plurality of axial housings for components, which housings are arranged on the outer surface of the drum.

The axial housings comprise a groove of the surface of the drum, leading to one face of the drum.

BRIEF DESCRIPTION OF THE DRAWINGS

The invention will be better understood on reading the following description, given only as an example and made with reference to the appended drawings:

FIG. 1 is a view in perspective of an electronic component,

FIGS. 2 and 3 are views in perspective of two variants of means for storing electronic components, FIG. 4 is a view in perspective of an item of plant according to an embodiment of the invention.

DETAILED DESCRIPTION OF THE DRAWINGS

Figure 5:
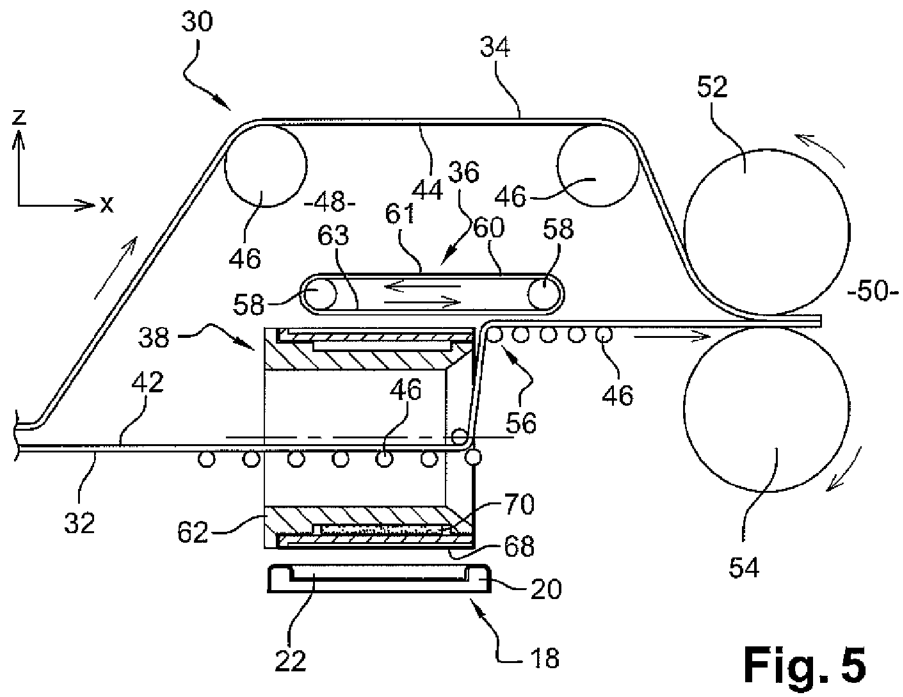
FIG. 5 is a view in section of the plant of FIG. 4, FIGS. 6 to 9 are views in section of the plant of FIG. 4 and of the drum of this plant, during four steps of a method according to an embodiment of the invention.

Shown in FIG. 1 is an electronic component, indicated by the general reference 10 and designed to be coated with rubber so as to form a member. In the example shown, the electronic component 10 is of the RFID type and comprises two antennas 12 connected to a chip 14 mounted on a board 16. Other types of electronic components can be used.

Once manufactured, the electronic components 10 are packaged in storage means 18 of which three variants are shown in FIGS. 2, 3 and 4.

According to a first variant shown in FIG. 2, the storage means 18 comprise a thermoformed tray 20 comprising two rows of parallel cells 22 in which the electronic components 10 are stored.

According to a second variant shown in FIG. 3, the storage means 18 comprise a reel 24 on which a flexible backing 26 in the form of tape is wound. The electronic components 10 are placed one beside the other on the tape 26.

Finally, according to a third variant shown in FIG. 4, the storage means 18 comprise a thermoformed tray 20 similar to that of the first variant but comprising only one row of cells 22 designed for the storage of the electronic components 10.

Shown in FIG. 4 is an item of plant 28 according to the invention for the manufacture of members each comprising at least one rubber-coated electronic component 10.

The plant 28 comprises:

the means 18 for storing the members 10 comprising the thermoformed tray 20, means 40 for generating two strips of rubber, a bottom strip 32 and a top strip 34, for example an extruder 40, means 30 for running the two strips of rubber 32 and 34, means 36 for placing electronic components 10 onto the bottom strip 32, means 38 for feeding the placement means 36 with components 10.

In order to describe the various elements comprising the plant 28, an XYZ rectangular coordinate system is defined in which the direction Z is vertical, oriented upwards.

The tray 20 of the storage means 18 extends in the plane X-Y and has a substantially rectangular shape, the length of which extends in the direction Y. The tray 20 is therefore substantially horizontal. The cells 22 formed by grooves of the surface of the tray 20 have an elongate shape extending across the tray 20, that is to say in the direction X.

The tray 20 can be moved in translation in the direction Y so as to be able to modify its position relative to the feeding means 38.

Once generated by virtue of the extruder, the strips 32 and 34 are guided by the running means 30 and each follow a different path. The paths of the two strips 32 and 34 are such that they occupy substantially one and the same vertical plane defined by the directions X and Z.

The bottom strip 32 is situated all along its path beneath the top strip 34 and comprises a top face 42 oriented facing a bottom face 44 of the top strip 34.

The running means 30 comprise a set of drive rollers 46 arranged so as to make the strips 32 and 34 run from a first zone 48, situated at the exit of the extruder 40, in which the two strips 32 and 34 are separated, to a second zone 50 in which the two respective faces 42 and 44 of the two strips 32 and 34 are in contact with one another.

In particular, the running means 30 comprise two terminal drive rollers 52 and 54 rotating in a direction opposite to one another and between which the two strips 32 and 34 run in contact with one another. These two rollers 52 and 54 roll on one another and make it possible to press the two strips 32 and 34 against one another at the entrance of the second zone 50.

The speed of the rollers 46, 52 and 54 of the running means 30 is controlled so that the two strips 32 and 34 run substantially at one and the same substantially constant speed.

The drive rollers 46 of the bottom strip 32 are arranged so that the second strip 32 is substantially horizontal in a predetermined placement zone 56 situated in the first zone 48 in which the two strips 32 and 34 are separated. In this placement zone 56, the drive rollers 46 of the bottom strip 32 are located beneath the strip so that its top face 42 is free.

The means 36 for placing the components 10 on the face 42 of the bottom strip 32 comprise two drive pulleys 58 and a notched belt 60 wound round the two pulleys 58. A top strand 61 of the belt 60 and a bottom strand 63 of the belt 60 are defined. The axes of rotation of the two pulleys 58 are substantially parallel to the direction Y and are contained in one and the same plane X-Y. Moreover, the diameter of the two pulleys 58 is identical. Thus, the two strands 61 and 63 are substantially parallel and horizontal and run in two opposite directions parallel to the direction X.

The direction of rotation of the pulleys 58 is determined so that the bottom strand 63 of the belt 36 runs in the same direction, and substantially at the same speed, as the bottom strip 32 in the placement zone 56.

Finally, the placement means 36 are arranged so that the downstream portion (relative to the direction of run) of the bottom strand 63 of the belt 60 is at least partially facing the top face 42 of the strip 32 in the placement zone 56. Where the belt and the strip overlap, the distance between the belt and the strip is determined so as to be substantially equal to the thickness of the electronic component 10.

The upstream portion of the bottom strand 63 faces the means 38 for feeding with components 10.

Thus, the bottom strand 63 of the belt 60 forms a conveyor from the feeding means 38 to the placement zone 56.

The feeding means 38 comprise a drum 62 of generally cylindrical shape with a horizontal axis oriented in the direction X, that is to say substantially parallel to the direction of run of the strip 32 in the placement zone 56.

The drum 62 has a shape of a hollow tube so that the bottom strip 32 can run inside the drum.

The feeding means 38 also comprise a support 64 of the drum 62. The support 64 is mounted so as to be able to move in translation in a vertical direction Z relative to a terrestrial frame of reference, and means (not shown) for moving the support 64 in translation are provided. The drum 62 is mounted so as to be able to rotate about its axis X relative to the support 64 and means (not shown) for rotating the drum are provided.

The drum 62 comprises an outer surface 66 of substantially cylindrical shape and comprising a plurality of grooves 68 forming housings for the electronic components 10 and evenly distributed about the drum. The grooves 68 are oriented along the axis X of the drum and lead in the direction X, as shown in FIGS. 4 and 5.

The drum 62 also comprises, at the bottom of each groove 68, magnetic means 70 that can be activated or deactivated in order to hold an electronic component 10 in the groove 68.

At a given moment, the drum 62 comprises a groove H situated at the top and a groove B situated at the bottom. The two grooves H and B are diametrically opposed and included in an axial plane of the drum which is substantially vertical, that is to say in a plane parallel to the plane X-Z.

The drum 62 and the storage means 18 are arranged relative to one another so that the bottom portion of the surface of the drum 62 faces the top surface of the storage means 18. Thus, the groove B faces a cell 22 of the storage means 18.

Moreover, the drum 62 is arranged so that the groove H is situated in the top portion of the drum 62 and faces the bottom strand 63 of the notched belt 60 of the placement means 36.

The distance separating the bottom strand 63 of the belt 60 and the top surface of the tray 20 of the storage means 18 is slightly greater than the diameter of the drum 62.

The manufacturing method according to the invention used by means of the plant 28 will now be described with reference to FIGS. 6 to 9. These four figures each represent on the one hand a view in section in the plane X-Y of the plant, that is to say in axial section relative to the drum, and, on the other hand, a view in section in the plane Y-Z of the drum 62, that is to say in radial section.

When the method is used, the two strips 32 and 34 and the belt 36 run at a substantially constant and identical speed.

Figure 6:
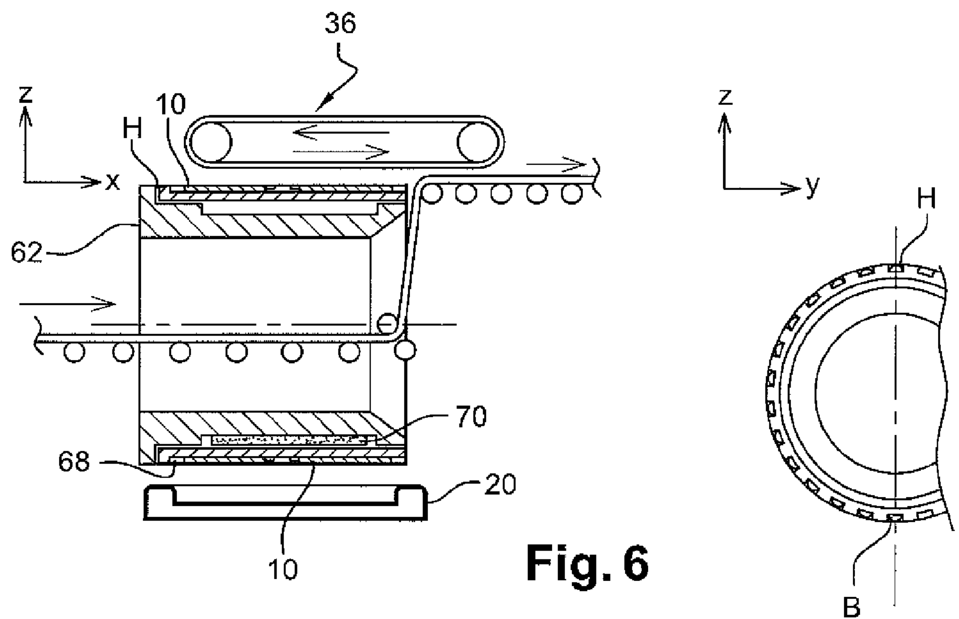

During a first step shown in FIG. 6, the vertical position of the drum 62 is such that it is situated substantially half way between the bottom strand 63 and the top face of the tray 20. As can be seen in the radial section of the drum, half of the housings formed by the grooves of the drum comprise an electronic component 10 held by virtue of the magnetic means 70. In particular, the top groove H and the bottom groove B each comprise an electronic component 10.

During a subsequent step, the translation means of the support 64 act so as to move the drum 62 upwards until the electronic component 10 situated in the top groove of the drum comes into contact with the bottom strand 63. In this configuration, the top groove H is substantially in line with the bottom strip 32 in the placement zone 56.

Figure 7:
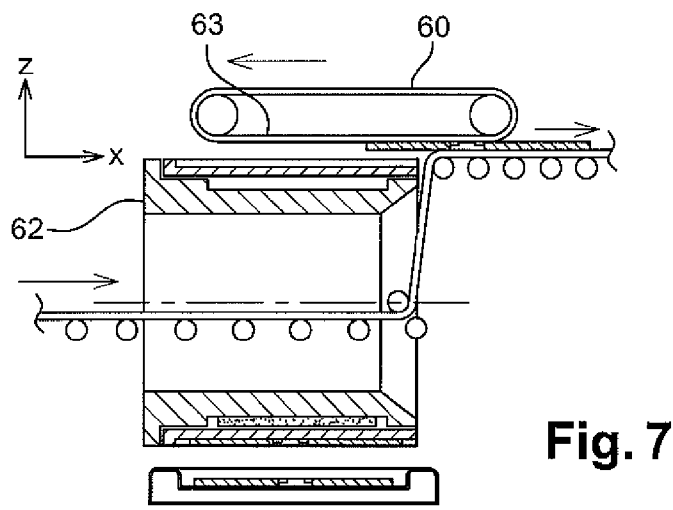
Figure 7:
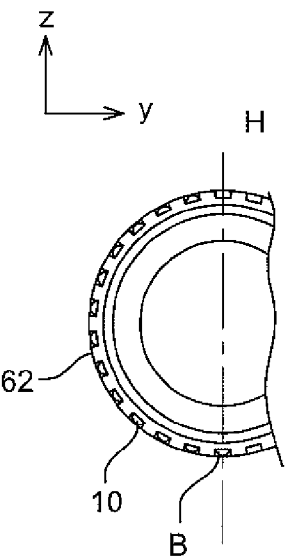
Figure 8:
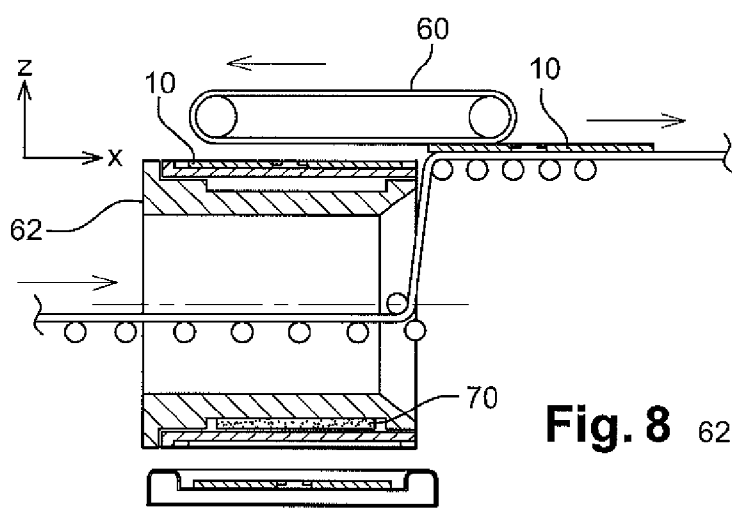
Figure 8:
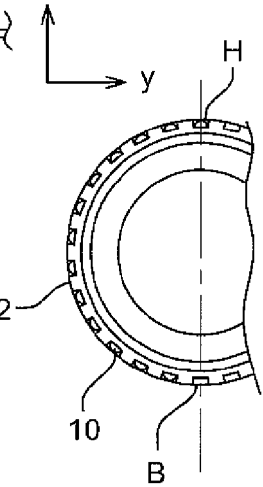

Then, the magnetic means for holding the electronic component 10 of the top groove H are deactivated so as to release it. Then, as shown in FIG. 7, under the effect of the movement of the notched belt 60 which comes into contact with the component 60, the said top electronic component 10 is conveyed at a substantially identical speed to the speed of movement of the strip 32 in the zone 56, which causes it to be deposited on the top face 42 of the strip 32. It is noted then in the radial section of the drum of FIG. 7 that the top groove H is now empty.

During a subsequent step, the tray 20 is moved in translation in the direction Y so as to present facing the bottom groove B of the drum a cell filled with an electronic component.

During a subsequent step, the means of vertical movement of the support 64 of the drum 62 act to move the drum downwards. Then, the means for rotating the drum act to turn the drum 62 through an angle equal to the angular distance separating two adjacent grooves. It is also possible to carry out the downward and rotational movement simultaneously for the purpose of reducing the cycle time. As shown in the radial section of the drum of FIG. 8, the top groove H of the drum is now filled with an electronic component. On the other hand, the bottom groove B is now empty because of the rotation of the drum.

Figure 9:
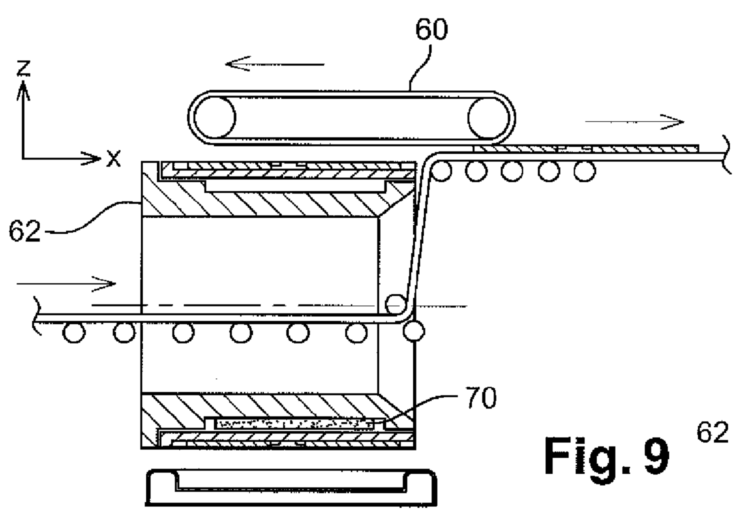
Figure 9:
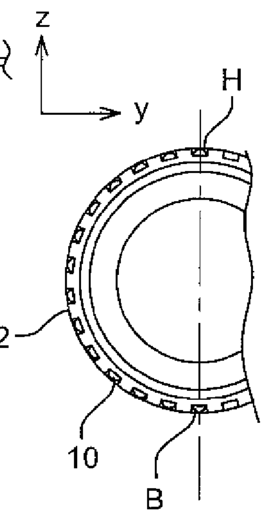

Then, as shown in FIG. 9, the drum is moved vertically downwards until its bottom groove B is close to the filled cell of the tray 20. Under the effect of the magnetic means, the electronic component 10 is then transferred from the cell of the tray 20 to the bottom groove B of the drum. Thus, as shown in the radial section of the drum of FIG. 9, the bottom groove B is filled with an electronic component 10.

Then, the drum is again moved in a vertical translation upwards until it occupies the position shown in FIG. 6.

The steps that have just been described are then reiterated so as to allow the placement, at regular intervals, of components on the top face 42 of the strip 32 in the placement zone 56.

The step of covering the electronic components with the second strip 34 is applied by virtue of the two rollers 54 and 52 in the second zone 50 as shown in FIG. 4.

A subsequent step of cutting the two strips 32 and 34 crosswise is then carried out at regular intervals, substantially equal to the interval separating two successive placements of components on the top face 42 of the strip 32.

The method and the plant that have just been described therefore make it possible to manufacture in a simple manner a member comprising a rubber-coated electronic component.

The invention claimed is:

1. A plant for manufacturing at least one member comprising at least one rubber-coated electronic component, the electronic component being adapted to be embedded into a tire or secured to a surface of the tire, comprising:

running means for running two strips of rubber arranged to cause the strips to run from a first zone in which the strips are separated to a second zone wherein two respective faces of the two rubber strips are in contact with one another, placement means for placing the component on one of the respective faces of one of the two rubber strips, in a predetermined placement zone situated in the first zone, feeding means for feeding the placement means with components, such feeding means comprising a drum arranged between the placement means and storage means for storing components, wherein the feeding means comprise means for moving the drum in translation between the placement means and the storage means, and means for rotating the drum.

2. The plant according to claim 1, wherein the placement means comprise a conveyor arranged to convey a component from the feeding means to the placement zone.

3. The plant according to claim 1, wherein the drum comprises magnetic means for holding the components on its outer surface.

4. The plant according to claim 1, wherein the drum comprises a plurality of axial housings for components, which housings are arranged on the outer surface of the drum.

5. The plant according to claim 4, wherein the axial housings comprise a groove of the surface of the drum, leading to one face of the drum.

6. The plant according to claim 5, wherein the plant comprises upwards translation means so as to move the drum upwards until the electronic component is situated in a top groove of the drum comes into contact with a bottom conveyor, wherein the placement means comprise the conveyor.

7. The plant according to claim 3, wherein the drum comprises means for rotating the drum and deactivable magnetic means for holding the electronic component.

8. The plant according to claim 7, wherein the placement means comprises a notched belt able to convey the component that is released by the deactivable magnetic means.

9. The plant according to claim 1, wherein the dielectric constant of the mass of rubber coating the electric member is less than the dielectric constants of the rubbers of the tire.

10. The plant according to claim 9, wherein the dielectric constant of the mass of rubber coating the electric member is less than 3 in the UHF frequency range.

* * * * *